United States Patent
Maussner et al.

(10) Patent No.: US 7,195,144 B2
(45) Date of Patent: Mar. 27, 2007

(54) METHOD FOR PRODUCTION OF A COMPONENT

(75) Inventors: Gerd Maussner, Nürnberg (DE); Gerd Neber, Oberasbach (DE); Michael Ott, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/536,759

(22) PCT Filed: Nov. 3, 2003

(86) PCT No.: PCT/DE03/03639

§ 371 (c)(1),
(2), (4) Date: May 26, 2005

(87) PCT Pub. No.: WO2004/050294

PCT Pub. Date: Jun. 17, 2004

(65) Prior Publication Data

US 2006/0010674 A1    Jan. 19, 2006

(30) Foreign Application Priority Data

Dec. 2, 2002    (DE) ............................... 102 56 414

(51) Int. Cl.
*B23K 31/02*    (2006.01)
*B23K 35/12*    (2006.01)
*B21D 53/78*    (2006.01)
*B23P 6/00*    (2006.01)

(52) U.S. Cl. ...................... 228/256; 228/212; 228/213; 228/245; 228/119; 29/889; 29/889.1

(58) Field of Classification Search ................ 228/256, 228/213, 245, 119, 212; 29/889
See application file for complete search history.

(56) References Cited

U.S. PATENT DOCUMENTS

| 4,386,051 | A | * | 5/1983 | Edgington | ................. 420/589 |
| 6,173,491 | B1 |  | 1/2001 | Goodwater et al. | |
| 6,214,248 | B1 | * | 4/2001 | Browning et al. | ............. 216/56 |
| 6,237,835 | B1 | * | 5/2001 | Litwinski et al. | ......... 228/112.1 |
| 2001/0030224 | A1 | * | 10/2001 | Eulenstein et al. | ........ 228/246 |

FOREIGN PATENT DOCUMENTS

| EP | 0 676 259 A1 |   | 10/1995 |
| JP | 54099747 A | * | 8/1979 |
| WO | WO 97/21516 |   | 6/1997 |

* cited by examiner

*Primary Examiner*—Jonathan Johnson
*Assistant Examiner*—Rachel E. Beveridge

(57) ABSTRACT

On production of a component, two primary pieces must often be fixed together to give one piece. In order to achieve the above, it is important that the two primary pieces are oriented in a particular manner during the fixing process, which provides some difficulties. According to the invention, a plug body is fixed to the component by a mounting, whereby the position of the plug body relative to the component remains unchanged during a fixing process.

8 Claims, 3 Drawing Sheets

METHOD FOR PRODUCTION OF A COMPONENT

CROSS REFERENCE TO RELATED APPLICATION

This application is the US National Stage of International Application No. PCT/DE2003/003639, filed Nov. 3, 2003 and claims the benefit thereof. The International Application claims the benefits of German Patent application No. 10256414.0 DE filed Dec. 2, 2002, both of the applications are incorporated by reference herein in their entirety.

FIELD OF THE INVENTION

The invention relates to a method for production of a component according to the preamble of the claims.

BACKGROUND OF THE INVENTION

During the production of components, it is often necessary for still further parts to be firmly connected to the component.

Such a method is disclosed, for example, by EP 868 253 B1. In this method, a filling element within a groove is firmly connected to the component. However, the connection between the filling element and the component in the groove is not sufficiently adequate, since the solder or the connecting layer between the filling element and the component is not uniform or is incomplete.

SUMMARY OF THE INVENTION

The object of the invention is therefore to overcome this problem.

The object is achieved by a method as claimed in the claims.

Further advantageous measures are listed in the subclaims. The measures listed in the subclaims can advantageously be combined with one another.

BRIEF DESCRIPTION OF THE DRAWINGS

The invention is explained in more detail in the following text by using figures, in which.

DETAILED DESCRIPTION OF THE INVENTION

Figure 1:
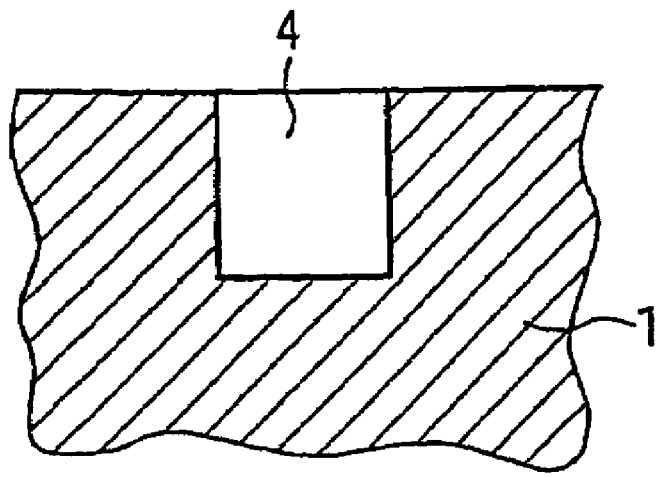
FIGS. 1, 2, 3 and 4 show a plurality of method steps of the method according to the invention.

FIG. 1 shows a component 1 in a first method step.

The component 1 has, for example, a groove 4. The component 1 is, for example, a gas turbine component, such as a turbine blade. Following use, the turbine blade exhibits cracks, which are to be repaired. Such a method is explained in more detail in EP 868 253 B1 and is intended to be the disclosure of this application. In this method, the groove 4 is produced as in FIG. 1, or there is an appropriate groove 4.

Figure 2:
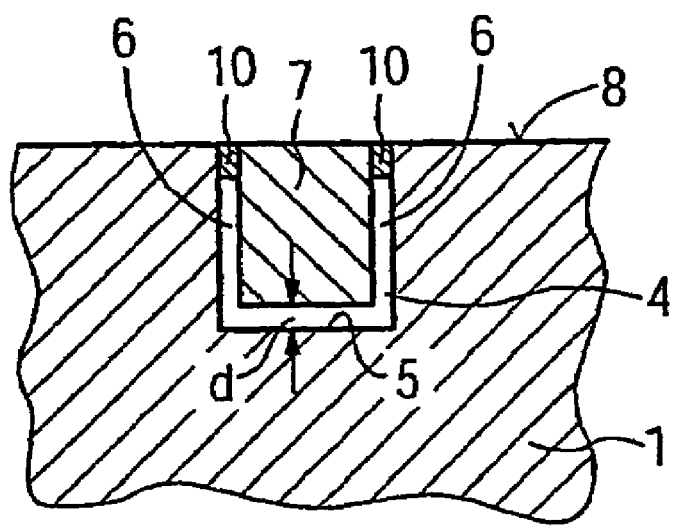

FIG. 2 shows the component 1 in a further method step of the method according to the invention.

A filling element 7 is to be connected firmly to the component 1 on a surface 8 of the component 1 or in a groove 4 (FIG. 2).

A distance d of the filling element 7 from the base 5 in the groove 4 can be zero or greater than zero.

In a gap 6 which is present between the filling element 7 and the component 1 in the groove 4, for example at least one spacer 10 is arranged, for example in the vicinity of the surface 8 of the component 1. In this way, a uniform gap can be achieved on both sides between the filling element 7 and the component 1 in the groove 4.

Figure 3:
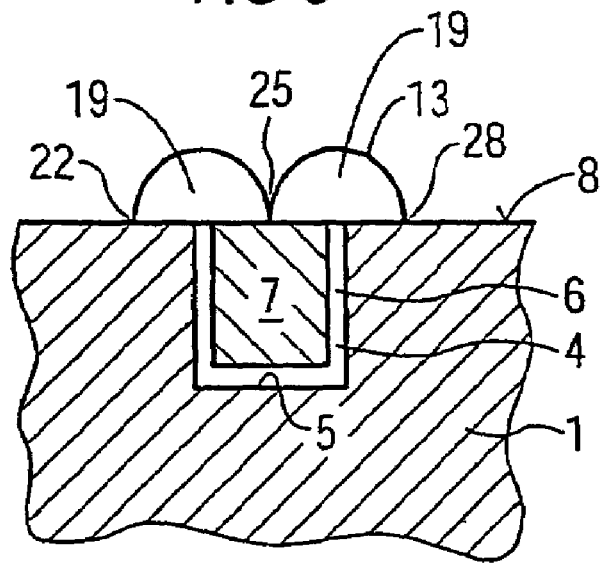

FIG. 3 shows the component 1 in a further method step of the method according to the invention.

In order to keep the filling element 7 in a fixed position during a fixing method for fixing the filling element 7 to the component 1, use is made of a holder 13 which connects the filling element 7 to the component 1 at least temporarily during a fixing method.

The holder 13 has at least one first holding point 22 on the surface 8 of the component 1 and at least one second holding point 25 on the filling element 7. The spacers 10 (FIG. 2) have been removed, for example following the fitting of the holder 13, but can also remain in the gap 6.

In particular, the holder 13 has the shape of a letter M. A first end of the M shape of the holder 13 constitutes the first holding point 22 on the component 1. The second end of the M shape of the holder 13 constitutes a third fixing point 28 on the component 1. In the middle of the M shape, the holder 13 is fixed to the filling element 7 at the holding point 25.

As a result of the M shape of the holder 13, an open cavity 19 is produced under the limbs of the M shape. As a result, the gap 6 is also freely accessible under the holder 13.

In order to fix the filling element 7 to the component 1, various fixing methods are available to choose. These are, for example, welding, lasering or electron beam welding and soldering methods.

Figure 4:
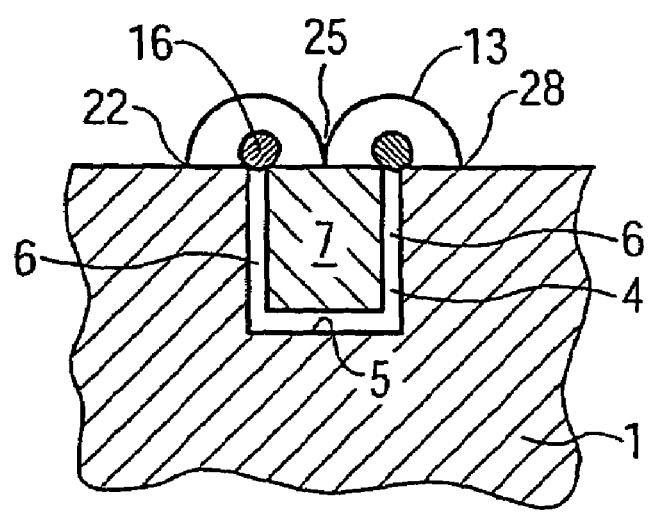

FIG. 4 shows, by way of example, the procedure for a soldering method.

A solder material 16, for example in the form of solder paste or solder powder, is applied, in particular in the vicinity of the gap 6. In a soldering process, the solder material 16 is melted and penetrates into the gaps 6 and fills them completely. In addition, if there is a distance d between filling element 7 and base 5 which is different from zero, a hollow volume between filling element 7 and base 5 can be filled with the solder material.

Figure 5:
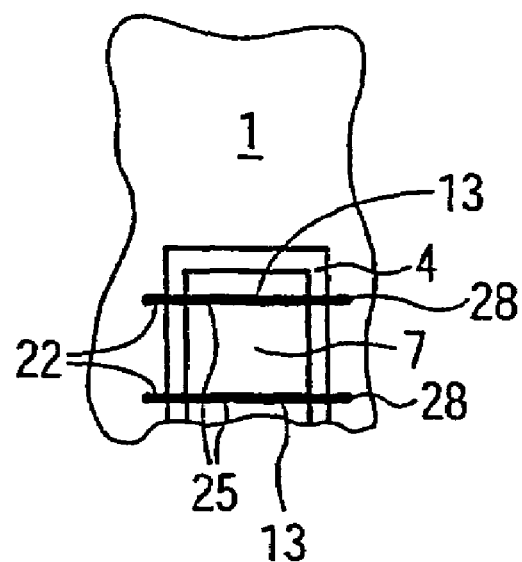
FIG. 5 shows a view of a component which is produced by the method according to the invention.

FIG. 5 shows a view of a component 1 according to FIG. 3. The view shows that two holders 13 are used in order to hold the filling element 7 in the groove 4. However, only one or else more than two holders 13 can also be used.

Figure 6:
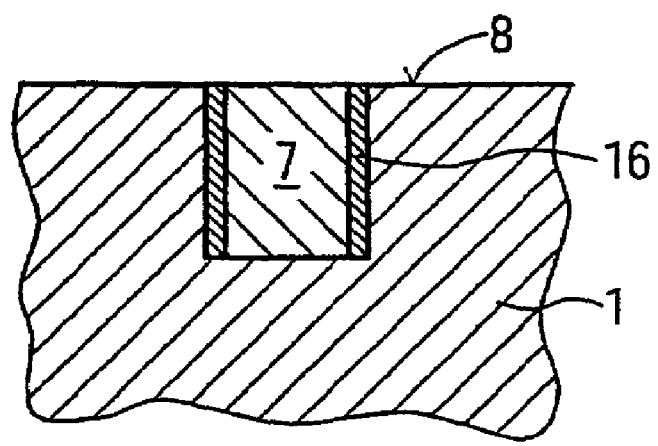
FIG. 6 shows a component after being finished by the method according to the invention.

FIG. 6 shows a component 1 which has been produced by the method according to the invention.

After a soldering operation, used by way of example, or after another fixing method, a connecting layer 16 or a solder layer 16 has been produced between the filling element 7 and the component 1, in the gap 6 previously present. In this way, a fixed connection is produced between the filling element 7 and the component 1. Excess solder material on the surface 8 and the at least one holder 13 are removed in a last method step, for example by grinding.

If the filling element 7 is welded on in the groove 4, then, depending on the welding method, only a partial connection can be produced between the filling element 7 and the component 1, at the points where the holder 13 is not present. In this case, a connection, welded seam, is produced at the accessible points. As a result, an adequately firm connection is provisionally produced between filling element 7 and the component 1. The at least one holder 13 can then be removed and the freely accessible region of the gap 6, which was previously hidden under the holder 13, can likewise be provided with a connecting layer 16 by means of welding or other connecting methods. The filling element 7 is then connected completely to the component.

Such a method can be used when repairing cracks.

The invention claimed is:

1. A method for production of a component having a surface, comprising:
   introducing a filling element into the component though a first side of the surface of the component;
   connecting the filling element to the component by a fixing method;
   during the fixing method of the filling element and component, using a holder that connects the filling element to the component at least temporally,
   wherein the holder has a first holding point on the first side of the surface of the component and a second holding point on the filling element; and
   removing the holder after the filling element and component have been fixed, wherein the filling element is introduced into a groove in the component, and between the filling element and the component in the groove there is a gap in which a spacer is arranged, and further wherein the spacer is arranged in the gap before the holder is fitted.

2. The method as claimed in claim 1, wherein the fixing method used for the filling element and component is a soldering method.

3. The method as claimed in claim 1, wherein the fixing method used for the filling element and component is a welding method.

4. The method as claimed in claim 1, wherein the fixing method used for the filling element and component is a laser welding method.

5. The method as claimed in claim 1, wherein the fixing method used for the filling element and component is an electron beam welding method.

6. The method as claimed in claim 1, wherein two holders are used.

7. The method as claimed in claim 1, wherein the holder is M-shaped.

8. The method as claimed in claim 1, wherein a first end of the M shape of the holder is fixed to a first holding point on the component, the middle of the M shape of the holder is fixed to a second holding point on the filling element, and a second end of the M shape of the holder is fixed to a third holding point on the component.

* * * * *